(No Model.) 3 Sheets—Sheet 1.
C. P. STEINMETZ.
ALTERNATING CURRENT DYNAMO ELECTRIC MACHINE.
No. 579,283. Patented Mar. 23, 1897.
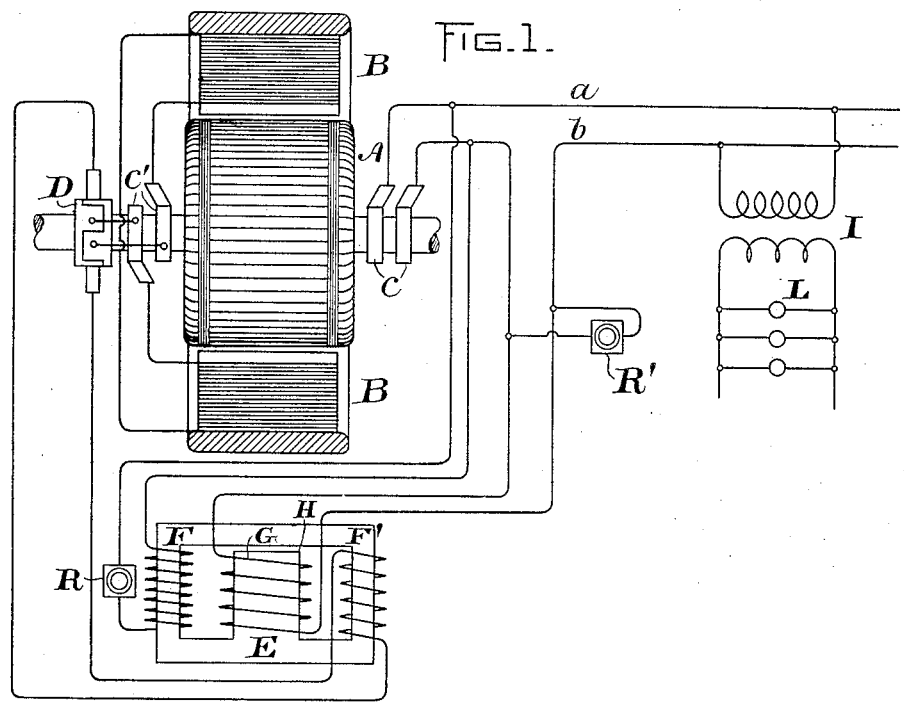
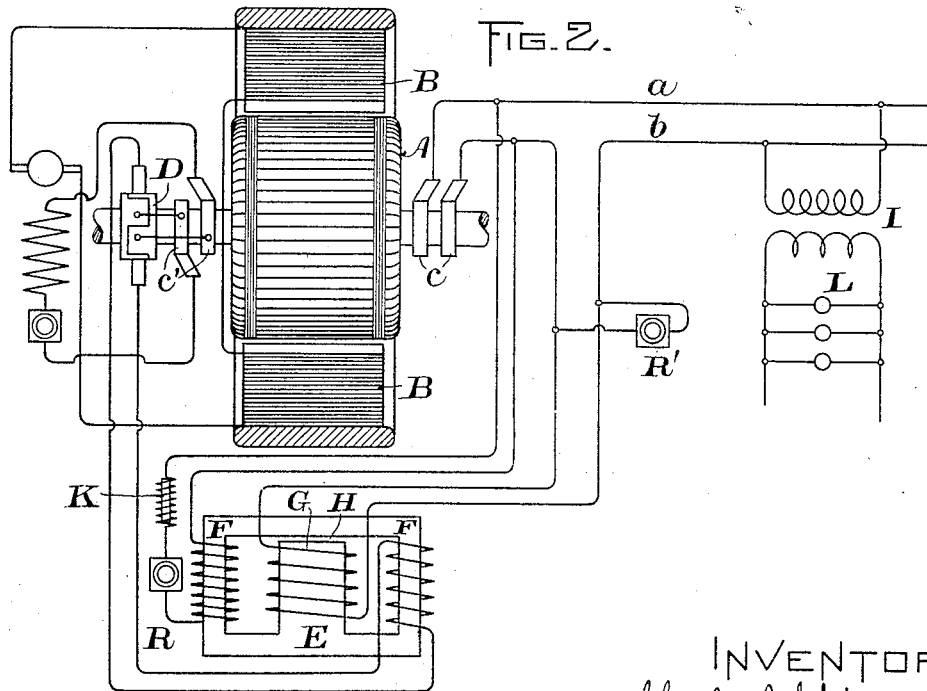
WITNESSES.
A. H. Abell.
A. F. Macdonald
INVENTOR.
Charles P. Steinmetz
Geo. R. Blodgett
Atty.

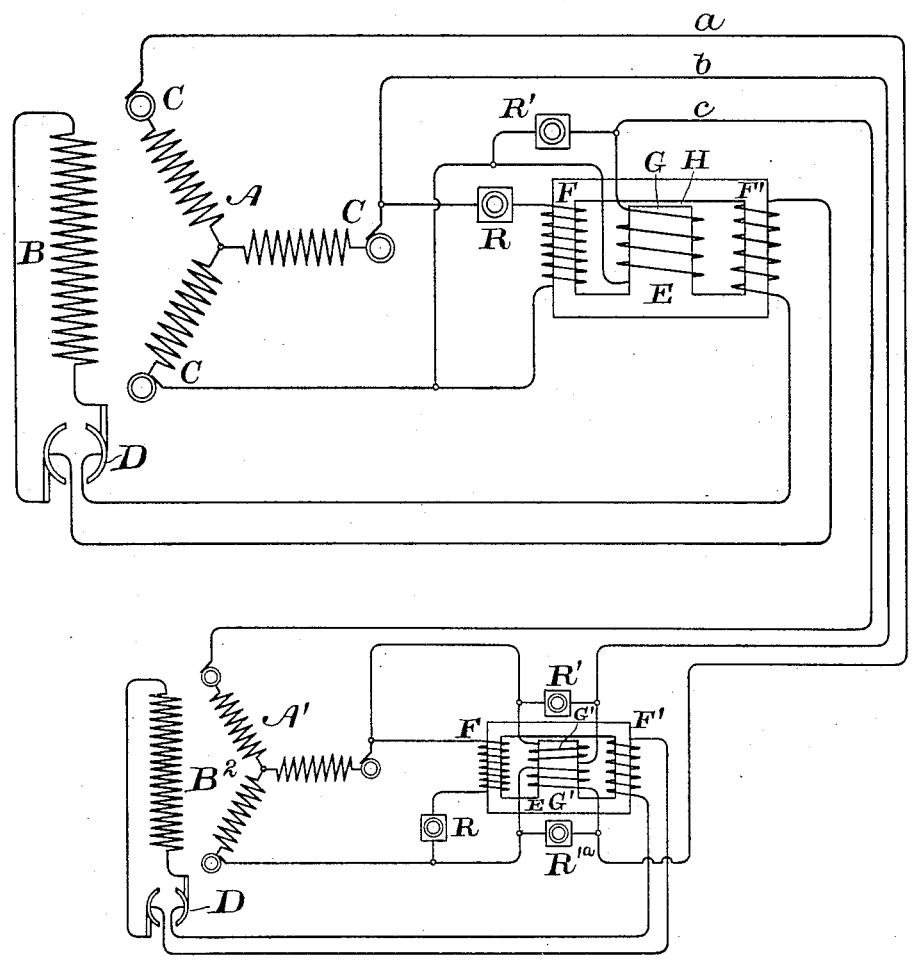

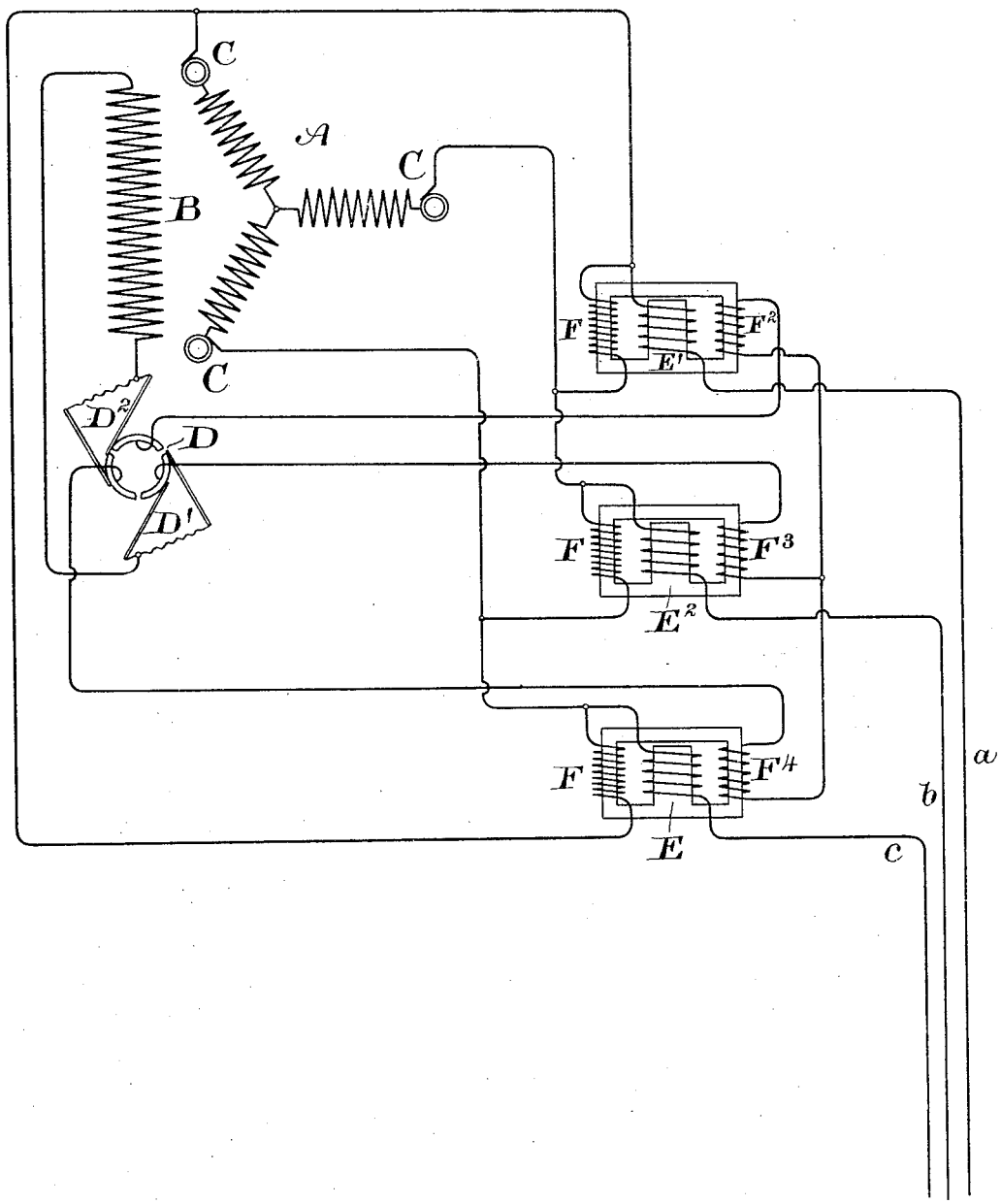

UNITED STATES PATENT OFFICE.

CHARLES P. STEINMETZ, OF SCHENECTADY, NEW YORK, ASSIGNOR TO THE GENERAL ELECTRIC COMPANY, OF NEW YORK.

ALTERNATING-CURRENT DYNAMO-ELECTRIC MACHINE.

SPECIFICATION forming part of Letters Patent No. 579,283, dated March 23, 1897.

Application filed March 20, 1896. Serial No. 584,041. (No model.)

*To all whom it may concern:*

Be it known that I, CHARLES P. STEINMETZ, a subject of the Emperor of Germany, residing at Schenectady, in the county of Schenectady, State of New York, have invented certain new and useful Improvements in Regulable Transformers and in Regulating Alternating-Current Dynamo-Electric Machines, (Case No. 333,) of which the following is a specification.

My invention relates to regulable transformers and to exciting and compounding alternating-current dynamo-electric machines, and has for its object to obviate some of the troubles incident to this operation when accomplished in various ways customary in the art. In such machines as usually constructed an external source of current for the field-magnets is provided, usually a small exciter-dynamo, and in addition to this a part of the current of the machine is rectified and passed around the field-magnets, by which an effect like that of the series coil in an ordinary compound-wound dynamo is produced. Difficulties are met with in commuting the current necessary in this form of construction, especially where an ordinary rectifying-commutator is used, as the large current and oftentimes high voltage give rise to troublesome sparking, to heating of the commutator, and other difficulties well known to engineers. Two commutators have also been employed, one in shunt, giving the no-load excitation, the other connected in series in the main, giving the compounding effect, but this is not only complicated, but does not compensate in the alternators for the lag and lead of the current, which varies with the nature of the load. Two transformers have also been proposed, one in series in the main circuit and one in shunt, their secondaries being connected in series with a rectifying-commutator, but in this case the secondary of the series transformer sends its current through the shunt-transformer secondary, and the latter thus acts as a choking-coil in the commutator-circuit. To obviate these difficulties, I employ in my invention a transformer having three windings and of the general type sometimes called a "leakage-transformer." The primary winding is in shunt to the main circuit. The secondary supplies the rectifying-commutator, from which the current is taken around the field-magnets of the machine. On another part of the same core, forming a magnetic shunt between the two coils, I wind a modifying-coil in series with the mains. Between the portion of the core upon which this coil is wound and part of the magnetic circuit is an air-gap. The effect of the magnetic shunt is determined by the action of the modifying-coil, as more fully hereinafter pointed out.

In ordinary single-phase apparatus at no load the modifying-coil would carry no current and a large part of the flux produced by the primary would pass through the magnetic shunt. The secondary voltage would thus be considerably less than that normally corresponding to the ratio of transformation. As the load comes on, however, a larger current passes through the modifying-coil, thus opposing the flux through the magnetic shunt, forcing it through the secondary coil, and thereby increasing the secondary voltage and the field-excitation of the main machine.

The arrangement just outlined may be employed either to directly supply the entire field-magnet excitation or it may be used to indirectly furnish the series-coil or compounding effect, in which latter case a separate exciter would ordinarily be used, of any convenient form, in which case the field-coil of the exciter would be supplied with current from the commutator in the circuit of the transformer-secondary.

By my invention the opposing magnetomotive force of the magnetic shunt depends not only upon the strength of the main current in the coils, but also upon the phase relation between the current and electromotive force—that is to say, such a transformer can be made to vary not only the secondary voltage, and this in proportion to the load, but also to vary it in correspondence with the nature of the load, or to compound for lead and lag.

In applying my invention to a dynamo of the polyphase type—for instance, to a three-phase machine—the primary coil would be connected in shunt to the main circuit across one phase. The modifying-coil would be connected in one of the main lines, suitable resistances being interpolated in order to control the current. Assuming that the load in this case is non-inductive, a phase displacement of thirty degrees would exist in a three-phase machine between the modifying-coil and the primary, and thus the magnetic shunt would oppose the component of the primary magnetic flux displaced thirty degrees. If now the current lags, the effect of the modifying-coil in opposing the primary becomes greater, opposing the magnetic-shunt flux more and increasing the excitation, while with a leading current the effect of the modifying-coil is to oppose the primary less, thus permitting the magnetic shunt to divert more of the lines of force and cutting down the excitation. It is of course unnecessary to proportion the apparatus strictly for a phase displacement of thirty degrees, which is taken merely for illustrative purposes. Any other suitable angle might be used, and such angle as may be desired can be readily obtained by forming the modifying-coil of the magnetic shunt of two coils connected in two lines and proportioned with proper numbers of turns to obtain the effect desired. So, also, in polyphase machines by using more than one transformer of the general type described all the phases may be compounded, securing a certain average regulation for unbalanced load. I may also use the same feature of compounding for lead and lag by phase displacement where no such displacement normally exists in the main circuit, as, for instance, in single-phase apparatus, in which case I may secure suitable phase displacement between the modifying-coil and the primary coil by any proper phase-changing device, such as an impedance in shunt to the modifying-coil or in series with the primary. The application of my invention, just briefly described, to synchronous motors is also apparent. In a synchronous motor, for instance, of the polyphase type a modifying-coil would be connected in the same way in one of the three main lines, but so as to oppose more at lagging and less at leading current to vary the excitation in correspondence with the variations of load, and in this way I obtain any suitable compounding or overcompounding effect, not only for the motor itself, but for the system, as where the field of the motor was automatically overexcited, the motor acting as a condenser in accordance with well-known principles.

In addition to compounding for lead and lag of the current and for variations of this compounding by the change in character of the load the device of my invention possesses also great advantages in that a substantially constant current is provided from the secondary for the rectifying apparatus—that is to say, if when the commutator-brushes pass over a gap a momentary short-circuit takes place at the commutator the increase of secondary current and the corresponding increase of primary current act to force more flux across the modifying-gap, and thus reduce the secondary voltage and limit the secondary current, which tends to obviate the difficulties already spoken of in connection with the rectification of the main current.

I have illustrated my invention in the accompanying drawings, in which—

Figure 1 is a diagrammatic view of a single-phase machine provided with my exciting and compounding apparatus, in which the field-magnet excitation is furnished directly from the transformer. Fig. 2 is a similar view employing a separate exciter. Fig. 3 is a diagram of a three-phase generator and a synchronous motor connected therewith, the machines being both supplied with exciting-current by means of my invention; and Fig. 4 is a diagram of a modification in which all of the phases are compounded, giving a compounding effect for unbalanced loads.

In Fig. 1, A is the armature of a single-phase alternating-current generator. B B are the field-magnets of the machine. C C are the collecting devices for the mains $a\ b$. The field-magnets B B are supplied with current from the collector-rings C', each of which is connected to one side of the rectifying-commutator D. I is an ordinary transformer supplying lamps L, diagrammatically indicating any form of load whatever. E is the transformer, to which I have referred in my statement of invention, provided with a primary coil F in shunt between the mains $a\ b$ and provided with a resistance R in series therewith. F is the secondary coil in circuit with the rectifying-commutator D. G is the modifying-coil interpolated in the main $b$, and R' is a resistance in shunt to the modifying-coil, by the regulation of which the amount of compounding may be adjusted. H is the air-gap, the central arm of the transformer-core forming the magnetic shunt to which I have referred.

It will be understood that the regulation of the primary F, by means of the resistance in series therewith, acts directly to control the output of the machine, while the regulation of the resistance R' serves to change the ratio of compounding by passing more or less of the series current through the modifying-coil G.

Referring now to Fig. 2, I show the same parts as in Fig. 1, they being indicated by the same letters, except that in Fig. 2 a separate exciter furnishes current to the field-magnet B of the main machine, its own field-magnet winding being supplied from the rectifying-commutator D through the collecting device C', the current being supplied, as before, from the secondary coil F' of the transformer E, arranged as in Fig. 1. In this figure I also show an impedance K, consisting of a reactance in series in the primary coil F. The action of this is to displace the phases of current in the primary coil F and the modifying-coil G. The amount of this impedance is selected to give the desired displacement of phase. Ordinarily the difference in the windings of the two coils would give currents of displaced phase, it being understood that the winding F is a fine winding of high self-induction, while G is a coil of larger wire and of few turns; but to obtain the desired phase relation the difference of inductance or reactance might not be sufficient, in which case the auxiliary impedance K would be employed. The electric actions, having already been pointed out in my statement of invention and resembling those existing in the polyphase machine, will not be further referred to.

Referring to Fig. 3, I illustrate three-phase apparatus, the parts being relatively the same as those in Fig. 1. In this case, however, the coil F is in shunt between two of the mains and has, as before, a resistance in series therewith. The modifying-coil G is in series in the lead $c$, and the resistance R' is in shunt, as before. In this construction the field-magnet B of the machine might be supplied with current from a separate exciter, arranged as in Fig. 2, without departing from my invention.

In the lower part of Fig. 3 is shown a synchronous motor of the three-phase type, A' being the armature, and B² the field; but in this case the modifying-coil is divided into two parts G' G', which are interpolated respectively in the leads $a\ b$, and each of which is provided with a shunting-resistance, respectively lettered R' and R'ᵃ. In a three-phase or two-phase or other polyphase apparatus this construction might also be applied to a generator with good effect.

In Fig. 4 I have shown a modified form of my invention. In this I employ three transformers E' E² E³ of the same general description as those already illustrated, and a three-phase machine is compounded by means of these transformers. The modifying-coils are in series in the three mains $a\ b\ c$ upon the respective transformers, the primary coils F are in shunt between the mains of different phase, and the secondary coils F² F³ F⁴ are combined in three-phase relation, leads therefrom going to the segments of the commutator D, which in this case is a three-part commutator provided with the usual overlapping arrangement of brushes, (indicated at D' D²,) by which all of the segments of the commutator are at all times maintained in circuit. This arrangement thus utilizes all of the phases and gives an average compounding effect for an unbalanced load.

In the claims annexed to this specification I have spoken of utilizing the resultant current in the secondary circuit as a means of energizing the field-magnets of the alternating dynamo. I mean to include in this and such substantially equivalent expressions as may occur in my claims both an indirect utilization, such as by the exciter-dynamo, and a direct, as by passing the rectified secondary current through the field-magnet windings on the main machine, and this whether the device be employed for compounding in conjunction with some other source of current or for the entire excitation. So, also, the synchronous motor is not excluded from my invention, though its principal utility is found in generators.

What I claim as new, and desire to secure by Letters Patent of the United States, is—

1. A transformer having primary and secondary circuits wound on its main core, a core forming a magnetic shunt to the part of the core on which the secondary is wound, a coil through which a variable current flows wound on said magnetic-shunt core, said current variably controlling the number of lines of force diverted from the secondary circuit through said magnetic shunt in inverse ratio to the demands on said secondary circuit.

2. A transformer having primary and secondary circuits wound on its main core which is of the closed-magnetic-circuit type, a core forming a magnetic shunt to the part of the core on which the secondary is wound, and a coil through which a variable current flows wound on said magnetic-shunt core, said current variably controlling the number of lines of force diverted from the secondary circuit through said magnetic shunt in inverse ratio to the demands on said secondary circuit.

3. A transformer having primary and secondary circuits wound on its main core which is of the closed-magnetic-circuit type, a core forming a magnetic shunt to the part of the core on which the secondary is wound, said magnetic-shunt core having an air-gap therein, and a coil through which a variable current flows wound on said magnetic-shunt core, said current variably controlling the number of lines of force diverted from the secondary circuit through said magnetic shunt in inverse ratio to the demands on said secondary circuit.

4. A transformer having primary and secondary circuits wound on its main core, a core forming a magnetic shunt to the part of the core on which the secondary is wound, and a coil in circuit with one of the primary mains wound on said magnetic-shunt core, the current in which coil variably controls the number of lines of force diverted from the secondary circuit through said magnetic shunt in inverse ratio to the demands on said secondary circuit.

5. In a system of electrical distribution, a transformer having its primary connected in parallel with the mains of the system, and secondary circuits wound on its main core, a core forming a magnetic shunt to the part of the core on which the secondary is wound, and a coil in series with one of the primary mains wound on said magnetic-shunt core, the current in which coil variably controls the number of lines of force diverted from the secondary circuit through said magnetic shunt in inverse ratio to the demands on said secondary circuit.

6. In combination, a source of alternating current, lines leading therefrom, and a transformer connected to the lines comprising primary and secondary coils, a magnetic shunt, a series coil upon the shunt opposing the passage of magnetic lines through the shunt, and a commutator in circuit with the secondary coil of the transformer.

7. In combination, an alternating-current dynamo-electric machine, and a transformer in the circuit thereof supplying its field-magnet excitation through a rectifying-commutator; the transformer comprising a core, a primary winding in shunt to the alternating-current mains, a magnetic shunt provided with a modifying series winding, the currents in which are of phase normally displaced relatively to those in the primary, and a secondary winding whose induction is compounded by the joint effects of the primary and modifying windings.

8. The combination of an alternating-current circuit, with a transformer comprising a core forming a closed magnetic circuit, and an intermediate magnetic shunt with a primary coil connected across the circuit-mains, a secondary coil, and a modifying-coil around the magnetic shunt in circuit with one of the circuit-mains and arranged so as to neutralize the effect of the shunt and increase the induction in the secondary coil on increase of current in the main circuit.

9. The combination of an alternating-current dynamo-electric machine, mains extending therefrom, and a transfomer comprising a primary coil in shunt to the mains, a magnetic shunt carrying a modifying coil or coils in series with the mains, and a secondary coil supplying the field-magnet excitation of the main machine.

10. The combination of a dynamo-electric machine of the alternating-current type, mains leading therefrom, a transformer furnishing the field-magnet excitation of the machine, the transformer comprising primary coils in shunt to the mains, secondary coils in inductive relation to the primary, a magnetic shunt in the transformer, and modifying-coils in series in the mains and determining the effect of the shunt, with means for varying the effect of the modifying-coils.

11. A dynamo-electric machine of the alternating-current type, mains extending therefrom, a transformer connected with the mains and furnishing field-magnet excitation for the machine, the transformer comprising primary coils in shunt to the mains, a secondary coil furnishing the field-magnet excitation, modifying-coils in series in the mains controlling a magnetic shunt in the transformer, and resistances for regulating the effect of the coils.

In witness whereof I have hereunto set my hand this 16th day of March, 1896.

CHARLES P. STEINMETZ.

Witnesses:
B. B. HULL,
A. F. MACDONALD.